Oct. 26, 1954  G. EATON  2,692,646
RUBBER CUTTING-OFF MACHINE
Filed Aug. 22, 1951  2 Sheets-Sheet 1
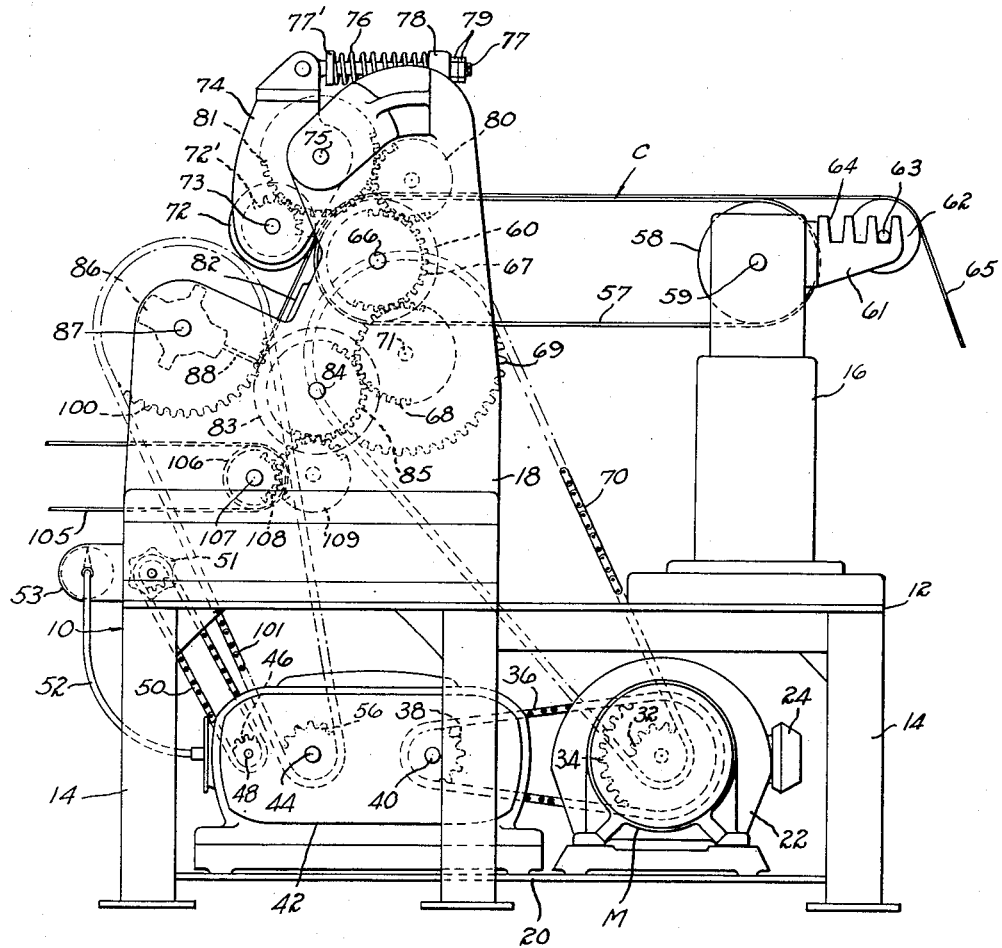
Inventor
GERALD EATON
By
Lindsey and Prutzman
Attorneys Oct. 26, 1954    G. EATON    2,692,646
RUBBER CUTTING-OFF MACHINE
Filed Aug. 22, 1951    2 Sheets-Sheet 2
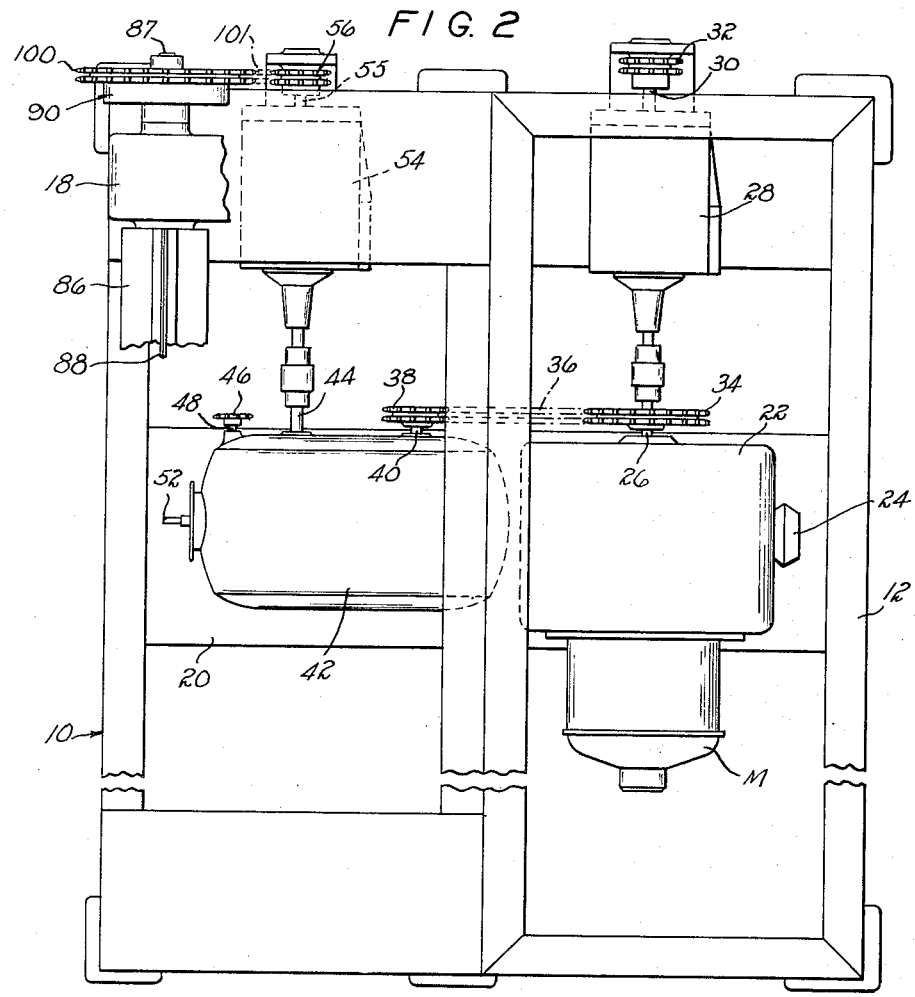
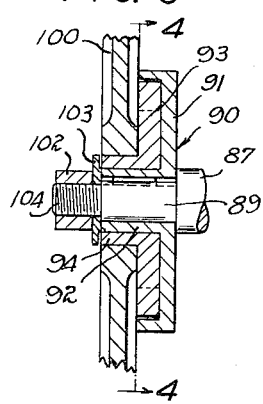
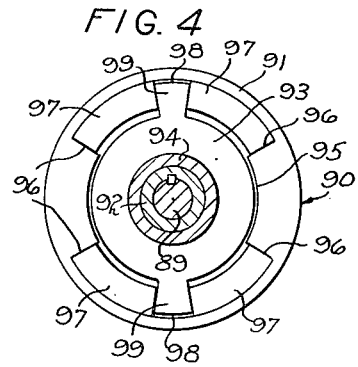
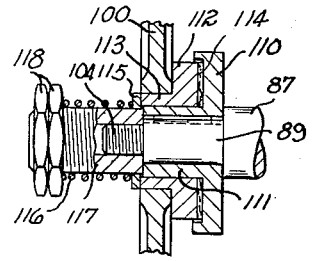
Inventor
GERALD EATON
By
Lindsey and Prutzman
Attorneys Patented Oct. 26, 1954

2,692,646

UNITED STATES PATENT OFFICE 2,692,646

RUBBER CUTTING-OFF MACHINE

Gerald Eaton, Manchester, Conn., assignor, by mesne assignments, to The Akron Standard Mold Company, Akron, Ohio, a corporation of Ohio Application August 22, 1951, Serial No. 243,098

11 Claims. (Cl. 164—68)

This invention relates to a cutting and shearing machine and more particularly to a cutting machine which is particularly adapted to transversely cut a continuously advancing web of resilient sheet material such as rubber into sections of selected predetermined equal lengths.

It is an object of the invention to provide a cutting or shearing apparatus operable to successively cut sections of exactly equal length from a continuously advancing web of sheet material.

Another object of the invention is to provide a cutting device for shearing sections of equal length from an advancing web of sheet material in which the speed of operation of the cutting device varies according to the rate of advance of the web and which will perform effectively throughout a wide range of operating speeds.

A further object of the invention is to provide an apparatus for shearing sections of equal length from an advancing web of resilient sheet material and having novel and improved means for adjusting the frequency of the cutting operation relative to the rate of web advance so as to condition the apparatus to cut sections of any desired length.

Another object of the invention is to provide an apparatus for shearing transverse sections from an advancing web of sheet material and having means whereby the apparatus can be adjusted to cut the web into sections of any desired length and which, after adjustment, will continue to cut the web into sections of the same predetermined length.

A further object of this invention is to provide an apparatus for transversely shearing an advancing web of sheet material such as rubber and which in the shearing operation will not stretch or compress the web whereby the apparatus may be successively operated in timed relation to shear sections of equal length from the web.

A still further object of the invention is to provide an apparatus for transversely shearing an advancing web of sheet material into sections and which has a coordinated drive for the shearing means and the web advancing means, the drive operating from a single power means whereby power variations will not alter the relationship between the rate of web advance and the frequency of the shearing operation.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 1 is a side elevational view of a rubber cutting machine constructed in accordance with the present invention;

Fig. 2 is a top plan view of a portion of the frame supporting the cutting machine and showing the drive arrangement for the machine;

Fig. 3 is a cross-sectional view of a speed coordinator for the cutting means;

Fig. 4 is a cross-sectional view taken substantially as indicated by the line 4—4 of Fig. 3; and Fig. 5 is a view similar to Fig. 3 but showing a modification of the coordinator which includes a slip clutch.

Referring to the drawings in detail, the reference numeral 10 indicates generally a three-part frame construction for supporting the elements of the cutting machine. The frame has an open top table section 12 which includes legs 14 and which supports beneath its top an electric motor M and other elements to be described later which comprise the drive assemblage for the machine. The frame 10 also includes a super-structure section 16 which supports elements of a feed conveyor C. The third section of the frame noted by reference numeral 18 is also disposed above the table section 12 and supports the discharge end of the feed conveyor C and also supports the elements which cooperate in cutting operation.

The above referred to drive assemblage is supported beneath the table 12 on transversely disposed frame elements 20 which are secured to the legs 14. The electric motor M is the prime mover for the drive assemblage and the motor drive shaft is directly coupled to an infinitely variable speed changing unit 22. A detailed description of the speed changing unit 22 is unnecessary in the present instance since the particular construction of the unit does not form a part of the present invention and most commercially available units will satisfy the needs of the present installation. The unit 22 is provided with manual adjusting means such as the knob 24 so that an operator can adjust the speed of the unit's output shaft 26 as desired. The output shaft 26 is connected through a transmission box 28 to a sprocket drive shaft 30 which mounts a double sprocket 32 for the purpose of driving the conveyor C in a manner which will be described in detail hereinafter.

The shaft 26 is keyed to a double sprocket 34 adjacent speed changer unit 22 which is drivingly interconnected by means of chain 36 to sprocket 33 keyed to the input shaft 40 of a second infinitely variable speed changer unit 42 disposed in side-by-side relation to unit 22. The speed changer or speed variator 42 is similar to the unit 22 having an output shaft 44 the speed of which can be regulated relative to the input shaft 40. The means for regulation comprises a sprocket 46 secured to a shaft 48 leading into the unit 42, the sprocket being connected by chain 50 to manually operable star wheel and sprocket 51 disposed adjacent the lefthand end of the frame 10 as viewed in Fig. 1. A flexible shaft 52 leading from the unit 42 provides means for a visible indication at 53 of the speed of output shaft 44. The output shaft 44 is coupled through a conventional transmission box 54 to a sprocket drive shaft 55 which carries double sprocket wheel 56 which furnishes the drive to the cutting means as will appear in greater detail hereinafter.

The aforedescribed elements of the drive assemblage are coordinated to provide a drive to the cutting means which is related to the drive to the conveyor means. The relation of the drives and the cooperation of the elements in the drive assemblage will be readily understood from the foregoing description taken in connection with the following explanation of the operation.

The electric motor M provides the source of power for each of the drives, the drive to the conveyor C being taken directly from the speed changer unit 22. The drive to the cutting means is taken from the output of the speed changer unit 42 which is connected at its input by chain 36 to the output of speed changer 22. The speed of the output shaft 44 may be manually adjusted relative to its input and thus relative to the output of unit 22. Accordingly, the speed of cutting means drive may be manually regulated relative to the speed of the conveyor drive which in turn may be regulated relative to the speed of the motor M. Thus, after an operator adjusts the speed of the cutting means drive as desired relative to the speed of the conveyor drive, the same relation will exist between the speed of the aforementioned drives despite variations or changes effected in the speed of the conveyor drive. As power changes may occur in the motor M causing variations in the driving speed of the motor, the speed variations will be reflected in the drive to the cutting means as well as the drive to the conveyor so as not to disturb the relation between these coordinated drives.

Conveyor C comprises an endless belt 57 supported about a roll 58 on the inlet end of the conveyor and a roll 60 on the discharge end of the conveyor. The roll 58 is mounted for rotation with a shaft 59 rotatably supported at each end by the frame section 16. Frame section 16 carries a pair of notched arms 61 which rotatably support a steering roll 62 on shaft 63 journaled at its ends within opposed notches 64. Thus, steering roll 62 may be selectively spaced from the conveyor roll 58 in substantially parallel relation thereto. The steering roll 62 receives a web of sheet material 65, such as rubber, and transversely supports and guides the web onto the top pass of the endless belt 57.

The conveyor roll 60 is keyed to a shaft 66 journaled at its end portions in the frame section 18 and which carries a driven gear 67. The driven gear 67 is engaged by gear 68 mounted for rotation with a sprocket 69 interconnected by chain 70 to the conveyor drive sprocket 32. The gear 68 and sprocket 69 are keyed to shaft 71 journaled in the frame section 18 and driven in a clockwise direction as viewed in Fig. 1. The gear 67 and conveyor roll 60 are thus driven counterclockwise to carry the upper pass of the endless belt 57 toward the left in Fig. 1 and at a speed which may be pre-selected by adjustment of the speed variator 22.

A web tensioning roll 72 is provided to engage the web 65 adjacent the conveyor roll 60, the roll 72 being mounted on shaft 73 which is journaled in frame plates 74, pivotally mounted to the frame section 18 on a transversely disposed shaft 75. The roll 72 and the frame plates 74 are biased counterclockwise toward engagement with the web 65 adjacent the conveyor roll 60 by means of spring 76 surrounding bolt 77 and disposed between a shoulder 77' thereon and a shoulder 78 on the frame section 18. The bolt 77 has a threaded end which receives adjusting nuts 79 for the purpose of adjusting the pressure of the tensioning roll 72 against the web 65 and conveyor roll 60. The roll 72 rotates with gear 72' which is driven by conveyor gear 67 through idler gears 80 and 81 rotatably mounted on a shaft secured by frame section 18 and on the transverse shaft 75, respectively. Thus, web 65 is engaged between roll 72 and conveyor roll 60 and is properly tensioned during advance along the conveyor C.

The web 65 passes downwardly between tensioning roll 72 and conveyor roll 60 and is guided by a transversely disposed guide 82 onto a cutter contact roll 83 keyed to shaft 84 which is journaled at its end portions in the frame section 18. A gear 85 is also fixed to the shaft 84 and engaged by drive gear 68. The roll 83 is slightly larger than conveyor roll 60 so as to have a peripheral speed equal to the belt speed of conveyor C and thus equal to the rate of advance of web 65.

A cutter head 86 is keyed to shaft 87 rotatably journaled in frame section 18 and carries a cutting blade 88. The blade 88 projects radially from the cutter head 86 so as to engage the periphery of the contact roll 83 during revolution of the cutter head. However, before the blade or knife engages the contact roll 83 during revolution of the cutter head, the knife will first engage the leading end portion of the web 65 which is guided over the contact roll 83 as previously described. Thus, in effecting engagement between the knife 88 and contact roll 83, the leading end portion of the web 65 is transversely sheared.

A speed coordinating unit 90 is associated with cutter head 86 to suit the speed of the cutter head to the speed of the contact roll during the cutting engagement. The unit 90 also provides a coupling between the cutter head and double sprocket 100 which is interconnected by chain 101 to the previously described drive sprocket 56. The unit or coupling 90 comprises a first plate or disk 91 having a hub 92 which is keyed to a reduced end portion 89 on cutter head shaft 87. A second disk or plate 93 is disposed adjacent the first plate 91 and has a hub 94 which rotatably embraces the hub 92. The disk 91 is dished or countersunk at 95 to receive the body portion of the plate or disk 93 and is also provided with a plurality of radially directed shoulders 96 adjacent the dished or countersunk portion 95 to accommodate a plurality of rubber inserts 97. For purposes of illustration four such rubber inserts are disclosed and are arranged in diametrically opposed pairs. The inserts 97 making up the respective pairs are spaced apart as at 98 to receive therebetween diametrically opposed radially outwardly directed lobes or ears 99 on the body of disk 93. Sprocket wheel 100 is keyed to the hub 94 of disk 93 for rotation therewith and a nut 102 and thrust washer 103 are secured over the threaded end 104 of the cutter head shaft 87 so as to retain the aforedescribed elements of the coupling in assembled relation.

When the sprocket 100 is driven, rotation will be imparted to disk 93 which, in turn, drives disk 91 by means of driving lobes or ears 99 engaging and pressing against the rubber inserts 97 carried by the disk 91. Since the disk 91 is keyed to the cutter head shaft, the cutter head will be rotated thereby. In this manner the unit 90 functions as a drive coupling for the cutter head. To understand the operation of the unit as a speed coordinator, one should first be acquainted with the conditions which necessitate the inclusion of means for coordinating the cutter head speed to the speed of the contact roll during cutting engagement therebetween.

The rate of advance of the web 65 is of course equal to the belt speed of the conveyor C and is also equal to the peripheral speed of the cutter contact roll 83. Hereinafter when the term "rate of advance" is used it should be understood to refer to the peripheral speed of the contact roll and to the belt speed of the conveyor as well as to the speed of the advancing web. Since the speed of the cutter head can be adjusted relative to the rate of advance by means of the speed changer 42 and since one cutting operation is performed for each rotation of the cutter head, an operator can thereby condition the machine to successively cut sections of equal length from the advancing web. In pre-adjusting or pre-conditioning the machine, the peripheral or linear speed of the cutting edge of the knife or blade 88 may differ from the rate of advance so that during cutting engagement of the blade 88 with the web 65 and contact roll 83 a bunching or stretching of the web will occur between contact roll 83 and conveyor roll 60. As a consequence, the sections successively sheared from the advancing web may differ in length. These operational errors are of greater magnitude when rubber or similarly flexible material is being cut into sections.

However, in accordance with the present invention, such operational errors are avoided by the incorporation of the unit 90 in the construction. The unit 90 releases the chain drive to the cutter head 86 and permits the same to be frictionally driven by the contact roll 83 during engagement of that roll with the cutting edge of the blade 88.

During cutting engagement between the contact roll 83 and the blade 88 the rotary speed of the cutter head 86 may be decreased or increased to suit the speed of the contact roll. Increasing or decreasing the cutter head speed will shift coupling disk 91 relative to coupling disk 93. Relative shifting of the disks within the unit 90 is permitted by the resiliency of the rubber inserts 97 which may be compressed during the shifting between shoulders 96 on disk 91 and the driving lobes or ears 99 on the disk 93. The cutting engagement between the blade 88 and roll 83 which institutes frictional drive for the cutter head in the roll lasts only momentarily and the disks 91 and 93 quickly revert to their normal drive positions as shown in Fig. 4. Accordingly, the cutter head 86 is driven by and at the speed of the chain drive except during the short interval when the shearing occurs at which time the cutter head is frictionally driven by the contact roll at the rate of web advance. As a result, sections of equal predetermined length are successively sheared from the advancing web.

A conveyor belt 105 receives the cut sections for removal from the machine. The belt 105 is carried by roll 106 on shaft 107, the shaft carrying gear 108 which is driven through idler 109 by gear 85.

The operation of the aforedescribed cutting machine is entirely automatic. The only manual steps to be taken are occasioned in initially conditioning the machine for operation at a desired speed to cut the web of sheet material into sections of desired length. The machine can be installed in a production line-up wherein it will receive the web of sheet material from another fabricating machine in the line-up. For example, the machine may be particularly well utilized to receive an advancing web of rubber from a calendering machine.

Such a calendering machine may be producing a web of rubber at the rate of 200 ft. per minute. In order to condition the cutting machine to accommodate the advancing web of rubber, it is necessary to adjust the infinitely variable speed changer unit 22 by means of adjusting knob 24 so that the drive to the conveyor C will provide a belt speed of 200 ft. per minute. If it is desired to cut the advancing web of rubber into sections of 6" in length it is necessary to adjust the speed of the cutter head 86 so that it will make two complete revolutions for each foot of web advance. Thus, in adjusting the speed of a cutter head relative to the rate of advance so as to obtain cut sections of 6" in length, the operator will adjust the cutter head to rotate at 400 R. P. M. The adjustment of the speed of the cutter head relative to the speed of the conveyor is effected by turning the control star wheel 51 which controls the speed changer 42.

Having thus conditioned the machine for automatic operation, the fabricating process can continue without the constant attention of the operator. As the speed of the conveyor is lessened the speed of the cutter head is lessened accordingly so that the sections cut from the advancing web will be of the same length. Power variations will be proportionately reflected in the drive to the cutter head and in the drive to the conveyor.

In Fig. 5 there is shown a slip clutch which may be substituted for the coupling unit 90 in a modification of the cutting machine. The slip clutch comprises a first plate 110 having a hub portion 111 keyed to the reduced section 89 of the cutter head shaft 87 and a second plate 112 having a hub 113 rotatably embracing the hub 111. The driven sprocket 100 in this modified construction is keyed to the hub 113 so as to rotate with the plate 112. An annular fibrous disk 114 is disposed between the clutch plates 110 and 112 to effect frictional driving engagement therebetween. A thrust washer 115 is biased by spring 116 to urge plate 112 axially toward plate 110 to effect the driving engagement therebetween. Spring 116 is carried by an internally and externally threaded nut 117 which is threaded about the threaded end portion 104 of shaft 87 and which receives therearound locking nuts 118 which abut against the outer end of spring 116.

The sprocket drive for cutter head 86 in the modified construction is translated through the clutch plates 112 and 110 by means of the interposed fibrous ring 114. During cutting engagement between the blade 88 and contact roll 83, that is, when the roll 83 frictionally drives the cutter head, the clutch connection is overpowered and the clutch plates 112 and 110 slip relative to each other. When the cutting engagement ceases, the sprocket drive is reinstated and continues in the manner previously described.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A machine for cutting an advancing web of flexible sheet material into sections of equal preselected length comprising, a roll transversely supporting the leading end portion of the web, first drive means for rotating said roll at a peripheral speed in keeping with the rate of advance of the web, a cutter head rotatably mounted adjacent the roll, a knife carried by said head and engageable with said roll in one rotated position of the head to transversely cut a section from the leading end portion of the web, a second drive means for continuously rotating said head, and a coupling drivingly coacting between said second drive means and the cutter head including means for releasing the head therefrom momentarily in response to the momentary engagement of the knife with said roll and said web, whereby the cutter head is frictionally rotated by said roll during cutting engagement.

2. A machine for cutting an advancing web of flexible sheet material into sections of equal preselected length comprising a roll transversely supporting the leading end portion of the web, cutting means rotatably mounted adjacent said roll and engageable therewith in one rotated position to transversely cut a section from the leading end portion of the web, a coordinated drive for the machine comprising first drive means rotating said roll at a peripheral speed in keeping with the rate of advance of the web, second drive means for continuously rotating the cutting means, said second drive means including means for adjusting the speed thereof relative to the rate of advance of the web, a coupling drivingly coacting between said second drive means and the cutter head and including means for momentarily releasing the cutter head therefrom in response to the momentary engagement of the knife with said roll and web, whereby the cutter head is frictionally rotated by said roll during cutting engagement.

3. A machine for cutting an advancing web of flexible sheet material into sections of equal preselected length comprising, a roll transversely supporting the leading end portion of the web, cutting means rotatably mounted adjacent said roll and engageable therewith in one rotated position to transversely cut a section from the leading end portion of the web, a coordinated continuous drive for the roll and cutting means comprising a drive shaft for each, speed control means associated with each of said shafts whereby the peripheral speed of the roll is adjustable to the rate of web advance and the speed of the cutting means drive shaft is adjustable relative to the rate of web advance, and a coupling drivingly coacting between the said drive and the cutter head including means for momentarily releasing the cutter head therefrom in response to the momentary engagement of the knife with said roll end web, whereby the cutter head is frictionally rotated by said roll during cutting engagement.

4. A machine for cutting an advancing web of flexible sheet material into sections of equal preselected length comprising, a roll transversely supporting the leading end portion of the web, cutting means rotatably mounted adjacent said roll and engageable therewith in one rotated position to transversely cut a section from the leading end portion of the web, a coordinated continuous drive for the roll and cutting means comprising an electric motor having a drive shaft, a first speed control unit associated with said motor drive shaft and having an output shaft driving said roll, a second speed control unit having an input shaft driven by the output shaft of said first speed control member and having an output shaft for driving said cutting means, and a coupling drivingly coacting between said output shaft and the cutter head including means for momentarily releasing the cutter head therefrom in response to the momentary engagement of the knife with said roll and web, whereby the cutter head is frictionally rotated by said roll during cutting engagement.

5. A machine for cutting an advancing web of flexible sheet material into sections of equal pre-selected length comprising in combination, a roll transversely supporting the leading end portion of the web, a cutter head rotatably mounted adjacent the roll, a knife carried by said head and engageable with said roll in one rotative position of the head to transversely cut a section from the leading end portion of the web, drive means for continuously rotating said roll at a peripheral speed in keeping with the rate of web advance, independently variable means responsive to said drive means for rotating the cutter head, a coupling drivingly coacting between said independently variable means and the cutter head and including a pair of flexibly connected discs for momentarily releasing the cutter head therefrom in response to the momentary engagement of the knife with said roll and web, whereby the cutter head is frictionally rotated by said roll during cutting engagement.

6. A machine for cutting an advancing web of flexible sheet material into sections of equal preselected length comprising a roll transversely supporting the leading end portion of the web, first drive means rotating said roll at a peripheral speed in keeping with the rate of web advance, cutting means rotatably mounted adjacent said roll and engageable therewith in one rotated position to transversely cut a section from the leading end portion of the web, second drive means for continuously rotating said cutting means, and speed co-ordinating means associated with said cutting means, said speed co-ordinating means comprising a first disk rotatable with the cutting means, a second disk rotatable with said second drive means, and means flexibly interconnecting said disks whereby said cutting means is rotated by said drive means into cutting engagement and is frictionally driven during said cutting engagement by said roll.

7. A machine for cutting an advancing web of flexible sheet material into sections of equal preselected length comprising a roll transversely supporting the leading end portion of the web, first drive means rotating said roll at a peripheral speed in keeping with the rate of advance of the web, a cutter head rotatably mounted adjacent said roll, a knife carried by said cutter head and engageable with said roll in one rotated position of said head to transversely cut a section from the leading end portion of the web, second drive means for continuously rotating said head, and speed co-ordinating means associated with said head comprising a first disk rotatable with said head, a second disk rotatable with said second drive means, and means flexibly interconnecting said disks whereby said head is rotated by said second drive means to effect cutting engagement between said knife and said roll and whereby said head is frictionally driven by said roll during said cutting engagement.

8. A machine for cutting an advancing web of flexible sheet material into sections of equal preselected length comprising a roll transversely supporting the leading end portion of the web, a cutter head rotatably mounted adjacent said roll, means for continuously rotating said cutter head, a knife carried by said cutter head and engageable with said roll in one rotated position of the head to transversely cut a section from the leading end portion of the web, a co-ordinated drive for the roll and cutter head comprising a drive shaft for each, speed control means associated with each of said drive shafts whereby the peripheral speed of the roll is adjustable to the rate of web advance and the rotary speed of the cutter head is adjustable relative to said rate of advance, and speed co-ordinating means associated with said cutter head comprising a first disk rotatable with the cutter head, a second disk rotatable with the cutter head drive shaft, and means flexibly interconnecting said disks whereby said cutter head is rotated by its drive shaft to effect cutting engagement between said knife and said roll and whereby said cutter head is frictionally driven during said cutting engagement by said roll.

9. A machine for cutting an advancing web of flexible sheet material into sections of equal preselected length comprising a roll transversely supporting the leading end portion of the web, a cutter head rotatably mounted adjacent said roll, a knife carried by said cutter head and engageable with said roll in one rotated position of the cutter head to transversely cut a section from the leading end portion of the web, a co-ordinated drive for the roll and cutter head comprising an electric motor having a drive shaft, a first speed control unit connected to the motor drive shaft and having an output shaft driving said roll, a second speed control unit having an input shaft driven by said output shaft and having an output shaft continuously driving said cutter head, and speed co-ordinating mean associated with said cutter head comprising a first disk rotatable with the cutter head, a second disk rotatable with the output shaft of the second speed control unit, and means flexibly interconnecting said disks whereby said cutter head is rotated by the output shaft of said second speed control unit to effect cutting engagement between said knife and said roll and whereby said cutter head is frictionally driven during said cutting engagement by said roll.

10. A machine for cutting an advancing web of flexible sheet material into sections of equal preselected length comprising a roll transversely supporting the leading end portion of the web, cutting means rotatably mounted adjacent said roll and engageable therewith in one rotated position to transversely cut a section from the leading end portion of the web, a co-ordinated drive for the machine comprising first drive means rotating said roll at a peripheral speed in keeping with the rate of advance of the web, second drive means for continuously rotating the cutting means including means for adjusting the speed thereof relative to said rate of advance, a clutch associated with said cutting means including a first disk rotatable with said cutting means, a second disk rotatable with said second drive means, and means releasably interconnecting said disks whereby said cutting means is rotated by said second drive means into cutting engagement and whereby said cutting means is frictionally driven by said roll during said cutting engagement.

11. A machine for cutting an advancing web of flexible sheet material into sections of equal preselected length comprising a roll transversely supporting the leading end portion of the web, a cutter head rotatably mounted adjacent said roll, a knife carried by said cutter head and engageable with said roll in one rotated position of said head to transversely cut a section from the leading end portion of the web, a co-ordinated continuous drive for the roll and cutter head comprising a drive shaft for each, speed control means associated with each of said drive shafts whereby the peripheral speed of the support means is adjustable to the rate of web advance and the rotary speed of the cutter head is adjustable relative to said rate of advance, and a clutch associated with said cutter head comprising a first disk rotatable with the cutter head, a second disk rotatable with the cutter head drive shaft, and means releasably interconnecting said disks whereby said cutter head is rotated by its drive shaft to effect cutting engagement between said knife and said roll and whereby said cutter head is driven by said roll during said cutting engagement.

References Cited in the file of this patent

UNITED STATES PATENTS

| Number | Name | Date |
| --- | --- | --- |
| 1,876,838 | Biggert | Sept. 13, 1932 |
| 1,936,485 | Schreck | Nov. 21, 1933 |
| 1,959,852 | Biggert | May 22, 1934 |
| 1,994,107 | Macfarren | Mar. 12, 1935 |